(12) United States Patent
Gupta et al.

(10) Patent No.: US 11,055,013 B2
(45) Date of Patent: Jul. 6, 2021

(54) RECOVERING FROM DATA LOSS USING COPY SERVICES RELATIONSHIPS BETWEEN VOLUMES

(71) Applicant: International Business Machines Corporation, Armonk, NY (US)

(72) Inventors: Lokesh M. Gupta, Tucson, AZ (US); Matthew G. Borlick, Tucson, AZ (US); Kevin J. Ash, Tucson, AZ (US); Kyler A. Anderson, Sahuarita, AZ (US)

(73) Assignee: International Business Machines Corporation, Armonk, NY (US)

( * ) Notice: Subject to any disclaimer, the term of this patent is extended or adjusted under 35 U.S.C. 154(b) by 68 days.

(21) Appl. No.: 16/258,246

(22) Filed: Jan. 25, 2019

(65) Prior Publication Data

US 2020/0241753 A1 Jul. 30, 2020

(51) Int. Cl.
*G06F 11/00* (2006.01)
*G06F 3/06* (2006.01)
*G06F 11/14* (2006.01)
*G06F 11/20* (2006.01)

(52) U.S. Cl.
CPC .............. *G06F 3/065* (2013.01); *G06F 3/067* (2013.01); *G06F 3/0619* (2013.01); *G06F 11/1448* (2013.01); *G06F 11/2071* (2013.01); *G06F 2201/84* (2013.01)

(58) Field of Classification Search
CPC .... G06F 11/14; G06F 11/142; G06F 11/1479; G06F 11/18; G06F 11/20; G06F 11/1402; G06F 11/1446; G06F 11/1448; G06F 11/1458; G06F 11/00; G06F 11/07; G06F 11/22; G06F 11/1451

USPC ........................................................ 714/1–57
See application file for complete search history.

(56) References Cited

U.S. PATENT DOCUMENTS

| | | | |
|---|---|---|---|
| 6,594,744 B1 * | 7/2003 | Humlicek | G06F 3/0601 |
| | | | 707/999.202 |
| 7,133,983 B2 | 11/2006 | Bartfai et al. | |
| 9,280,296 B2 | 3/2016 | Crawford et al. | |
| 9,535,907 B1 * | 1/2017 | Stringham | G06F 11/1435 |
| 2005/0071708 A1 | 3/2005 | Bartfai et al. | |
| 2007/0028065 A1 | 2/2007 | Spear et al. | |

(Continued)

OTHER PUBLICATIONS

IBM, "IBM TotalStorage Enterprise Storage Server PPRC Extended Distance," IBM Redbooks, No. SG24-6568-00, Jun. 2002, 184 pages.

*Primary Examiner* — Sarai E Butler
(74) *Attorney, Agent, or Firm* — Zilka-Kotab, P.C.

(57) ABSTRACT

A computer-implemented method, according to one embodiment, includes: in response to experiencing a loss of data at a first track of a source volume, determining whether a copy of the lost data has been stored at a second track of a target volume. Moreover, in response to determining that a copy of the lost data has been stored at a second track of the target volume, determine whether the copy of the lost data has been altered since being stored at the second track of the target volume. In response to determining that the copy of the lost data has not been altered since being stored at the second track of the target volume, a request for the copy of the lost data is sent to the target volume. In response, the copy of the lost data is received, and used to recover the lost data.

18 Claims, 7 Drawing Sheets

(56) References Cited

U.S. PATENT DOCUMENTS

| | | | |
|---|---|---|---|
| 2011/0219192 A1* | 9/2011 | Hutchison | G06F 11/1435 711/135 |
| 2012/0303999 A1* | 11/2012 | Calder | G06F 11/1471 714/6.3 |
| 2015/0227575 A1* | 8/2015 | Jaquette | G06F 16/11 707/645 |
| 2015/0278049 A1* | 10/2015 | Saito | G06F 11/20 714/6.3 |
| 2015/0286456 A1* | 10/2015 | Griffin | G06T 1/60 345/1.2 |
| 2015/0378832 A1* | 12/2015 | Brown | G06F 11/2058 714/19 |
| 2016/0077930 A1* | 3/2016 | Mckelvie | G06F 11/1402 714/19 |
| 2016/0098330 A1* | 4/2016 | Mu | G06F 3/0619 714/6.23 |
| 2016/0202925 A1* | 7/2016 | Dain | G06F 11/1076 714/6.22 |
| 2016/0203055 A1* | 7/2016 | Dain | G06F 11/14 714/6.24 |
| 2018/0107573 A1 | 4/2018 | Blea et al. | |
| 2019/0220198 A1* | 7/2019 | Kashi Visvanathan | G06F 16/184 |
| 2020/0004858 A1* | 1/2020 | Gitelman | G06F 16/2456 |
| 2020/0125656 A1* | 4/2020 | Li | G06F 16/2358 |

* cited by examiner

US 11,055,013 B2

RECOVERING FROM DATA LOSS USING COPY SERVICES RELATIONSHIPS BETWEEN VOLUMES

BACKGROUND

The present invention relates to data storage systems, and more specifically, this invention relates to transferring data between storage locations in distributed data replication systems.

In current data replication systems, the application nodes at a storage location, such as a primary storage location, modify the data and queue the data modification operations to a gateway node. The gateway node may apply optimization techniques to the operations which are received, e.g., such as coalescing small contiguous write operations into single write operation, before sending the operations asynchronously to a remote location, such as a recovery storage location. Accordingly, the recovery storage location is able to maintain a redundant copy of the data which is stored at the primary storage location.

This redundant copy of the data at the recovery storage location is particularly useful in situations where the primary storage location becomes unavailable and/or experiences data loss. In some situations, the recovery storage location is able to assume operational responsibility in response to determining that the primary storage location is unable to. However, when the primary storage location becomes available, there is often a significant amount of data and applications which are transferred back from the recovery storage location before the primary storage location can actually regain operational responsibility.

SUMMARY

A computer-implemented method, according to one embodiment, includes: in response to experiencing a loss of data at a first track of a source volume, determining whether a copy of the lost data has been stored at a second track of a target volume. In the present embodiment, the source and target volumes share a point-in-time copy relationship. Moreover, in response to determining that a copy of the lost data has been stored at a second track of the target volume, a determination is made as to whether the copy of the lost data has been altered since being stored at the second track of the target volume. In response to determining that the copy of the lost data has not been altered since being stored at the second track of the target volume, a request for the copy of the lost data is sent to the target volume. In response, the copy of the lost data is received, and used to recover the lost data at the first track of the source volume.

A computer program product, according to another embodiment, includes a computer readable storage medium having program instructions embodied therewith. The program instructions are readable and/or executable by a processor to cause the processor to: perform the foregoing method.

A system, according to yet another embodiment, includes: a processor, and logic integrated with the processor, executable by the processor, or integrated with and executable by the processor. Furthermore, the logic is configured to: perform the foregoing method.

Other aspects and embodiments of the present invention will become apparent from the following detailed description, which, when taken in conjunction with the drawings, illustrate by way of example the principles of the invention.

DETAILED DESCRIPTION

Figure 1:
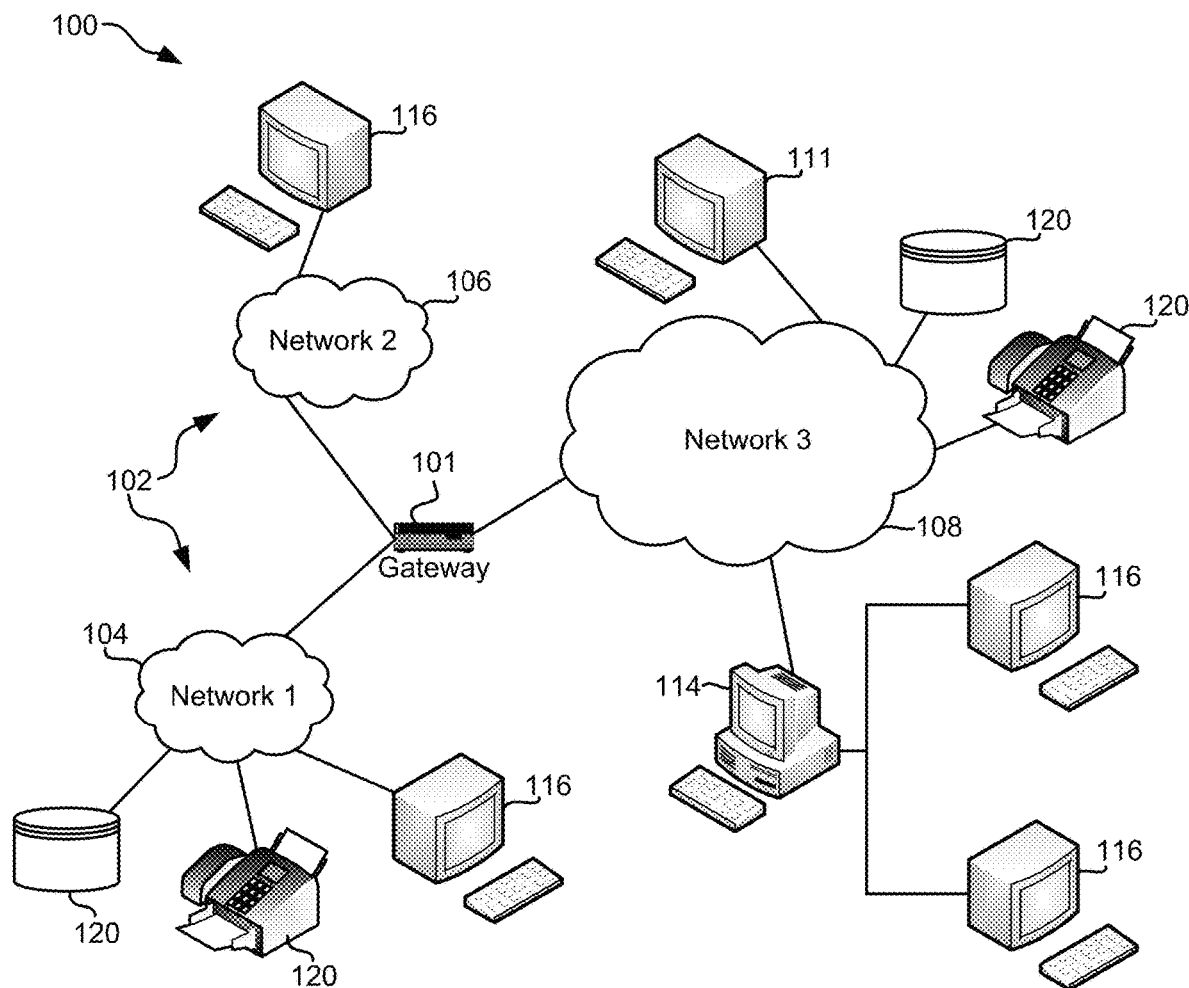
FIG. 1 is a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for efficiently recovering from data losses experienced by different volumes in a distributed data replication system. Particularly, some of the embodiments described herein are able to recover from data losses experienced at a source volume in a manner which significantly reduces system downtime, processing delays, network strain, and other setbacks previously experienced by conventional processes, e.g., as will be described in further detail below.

In one general embodiment, a computer-implemented method includes: in response to experiencing a loss of data at a first track of a source volume, determining whether a copy of the lost data has been stored at a second track of a target volume. In the present embodiment, the source and target volumes share a point-in-time copy relationship. Moreover, in response to determining that a copy of the lost data has been stored at a second track of the target volume, a determination is made as to whether the copy of the lost data has been altered since being stored at the second track of the target volume. In response to determining that the copy of the lost data has not been altered since being stored at the second track of the target volume, a request for the copy of the lost data is sent to the target volume. In response, the copy of the lost data is received, and used to recover the lost data at the first track of the source volume.

In another general embodiment, a computer program product includes a computer readable storage medium having program instructions embodied therewith. The program instructions are readable and/or executable by a processor to cause the processor to: perform the foregoing method.

In yet another general embodiment, a system includes: a processor, and logic integrated with the processor, executable by the processor, or integrated with and executable by the processor. Furthermore, the logic is configured to: perform the foregoing method.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
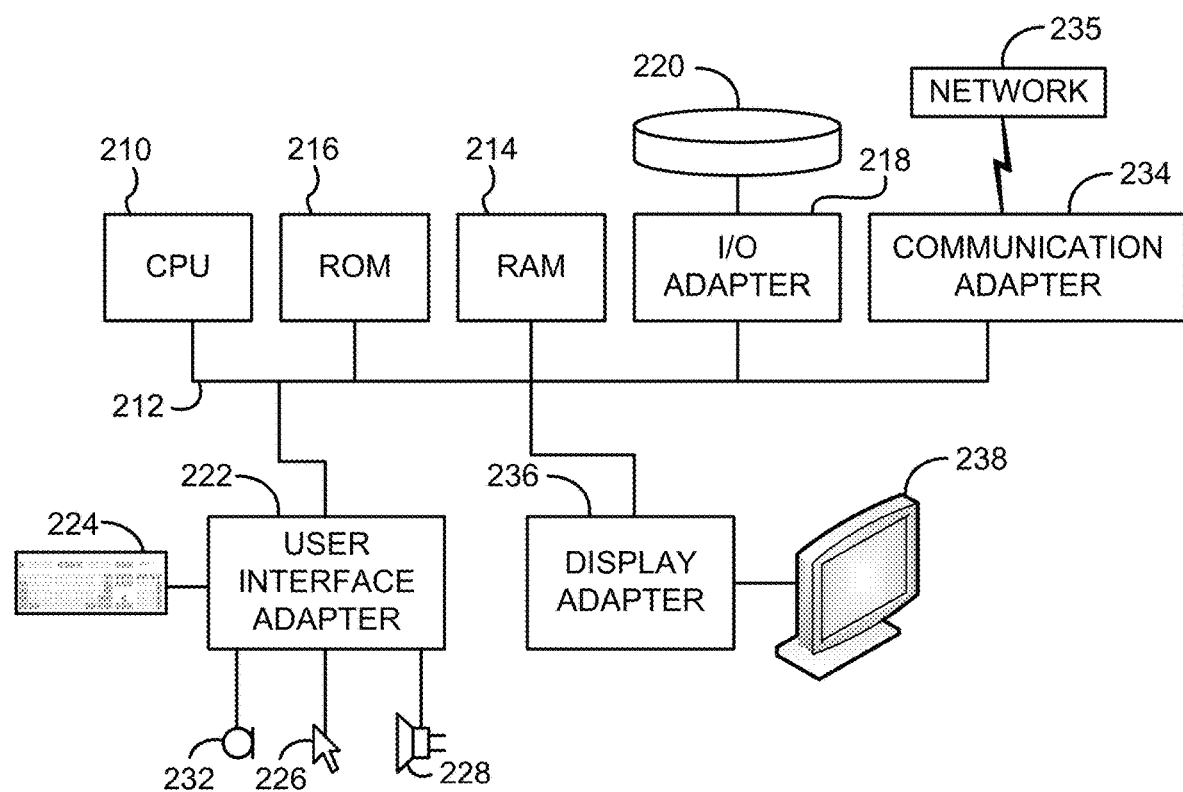
FIG. 2 is a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

Figure 3:
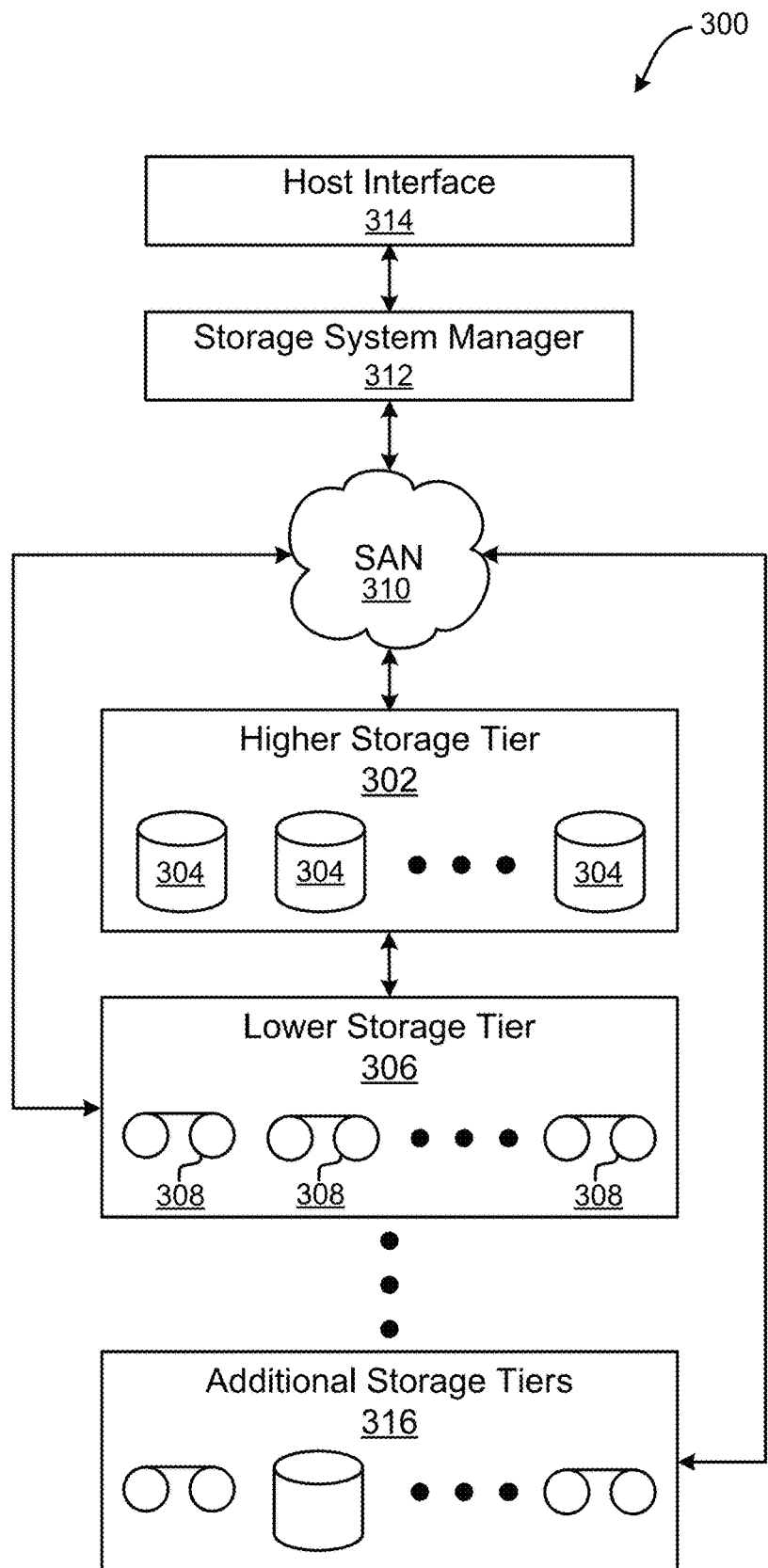
FIG. 3 is a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media and/or drives on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the drives and/or storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

As previously mentioned, a recovery storage location is able to maintain a redundant copy of the data at a primary storage location. This redundant copy of the data at the recovery storage location is particularly useful in situations where the primary storage location experiences issues and/or data loss. In some situations, the recovery storage location is able to assume operational responsibility following a determination that the primary storage location is unavailable. However, when the primary storage location becomes available again, there is often a significant amount of data and applications which are transferred back from the recovery storage location before the primary storage location can actually regain operational responsibility. This process involves a substantial amount time during which applications are inoperable, thereby resulting in undesirable processing delays. Transferring operational responsibility is even more inefficient when implemented in an attempt to recover from track level and/or volume level data losses, particularly when experienced at the primary storage location.

In sharp contrast to these conventional shortcomings, various ones of the embodiments included herein are able to recover from data losses experienced by volumes at a primary storage location (which are also referred to herein as "source volumes") and/or volumes at a recovery storage location (which are also referred to herein as "target volumes") with little to no impact on system performance. In other words, some of the embodiments described herein are able to recover from data losses experienced at one or more source volumes at a primary storage location and/or recover from data losses experienced at one or more target volumes at a secondary storage location. Moreover, the source and target volumes may be on the same or different machines depending on the approach, e.g., as will be described in further detail below. As a result, processing delays resulting from data errors are essentially eliminated, system throughput is increased, strain on queues throughout the system is reduced, system resources are conserved, etc., as will soon become apparent.

Figure 4:
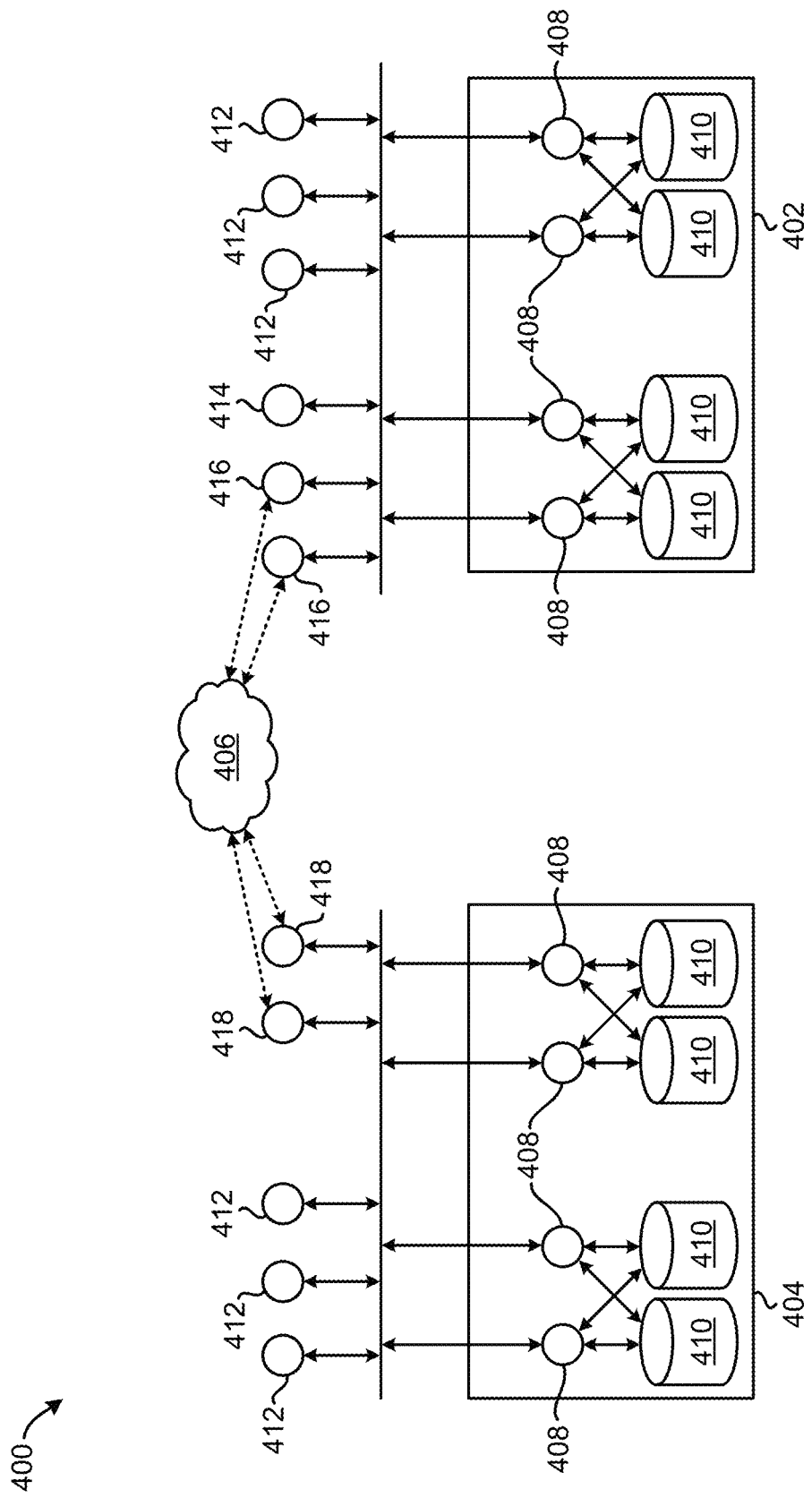
FIG. 4 is partial representational view of a distributed data replication system in accordance with one embodiment.

Looking to FIG. 4, a distributed data replication system 400 is illustrated in accordance with one embodiment. As an option, the present replication system 400 may be implemented in conjunction with features from any other embodiment listed herein, such as those described with reference to the other FIGS. However, such replication system 400 and others presented herein may be used in various applications and/or in permutations which may or may not be specifically described in the illustrative embodiments listed herein. Further, the replication system 400 presented herein may be used in any desired environment. Thus FIG. 4 (and the other FIGS.) may be deemed to include any possible permutation.

As shown, the distributed data replication system 400 includes a primary site 402 and a secondary site 404 which are connected by a network 406. According to some approaches, the primary site 402, or at least the data storage devices 410 at the primary site 402, may be considered as being a "primary machine". Similarly, the secondary site 404, or at least the data storage devices 410 at the secondary site 404, may be considered a "secondary machine", e.g., as would be appreciated by one skilled in the art. Moreover, the primary site 402 typically corresponds to a "first storage location" while the secondary site 404 corresponds to a "second storage location" as used in some of the embodiments herein. Thus, in some approaches the primary site 402 receives and satisfies data operations received (e.g., from a user), while the secondary site 404 maintains an updated copy of the data at the primary site 402 by replicating data operations satisfied at the primary site 402.

However, it should be noted that the primary and secondary storage locations are located at a same site (e.g. machine) in other embodiments. In other words, the various volumes included at the primary and secondary storage locations are stored on a same machine (e.g., physical storage device) in some approaches. For example, a source volume and a target volume for a flash copy data replication scheme may be stored at respective locations on a same one or more of the data storage devices 410 at the primary or secondary site 402, 404, e.g., as will be described in further detail below.

Referring again to FIG. 4, the network 406 may be of any type, e.g., depending on the desired approach. For instance, in some approaches the network 406 is a WAN, e.g., such as the Internet. However, an illustrative list of other network types which network 406 may implement includes, but is not limited to, a LAN, a PSTN, a SAN, an internal telephone network, etc. Accordingly, the primary site 402 and the secondary site 404 are able to communicate with each other regardless of the amount of separation which exists therebetween, e.g., despite being positioned at different geographical locations.

Both the primary site 402 and the secondary site 404 include a number of data access nodes 408 which are coupled to various data storage devices 410. In some approaches, one or more of the data access nodes 408 serve as virtual machines which provide access to data stored in the distributed data replication system 400. Thus, various ones of the data access nodes 408 may implement (e.g., run) any number of applications. According to an illustrative approach, which is in no way intended to limit the invention, one or more of the data access nodes 408 serve as a migration client which issues read operations, write operations, update operations, etc. received from a user and/or application being run thereby.

Moreover, in some approaches, each of the data storage devices 410 at each of the respective sites 402, 404 are of a same type of storage, e.g., SSD, Flash-based SSD, HDD, magnetic tape, etc. According to an illustrative example, each of the data storage devices 410 at the primary and secondary sites 402, 404 include Flash-based SSDs. However, according to another example, each of the data storage devices 410 at the primary site 402 include SSDs, while each of the data storage devices 410 at the secondary site 404 include HDDs. In still other approaches, the various storage devices 410 at either of the respective sites may include more than one different type of storage.

Each of the data access nodes 408 are also in communication with several different node types. For instance, data access nodes 408 at both the primary site 402 and the secondary site 404 are coupled to a plurality of compute nodes 412. Looking specifically to the primary site 402, the compute nodes 412 may currently be running one or more applications. Each of these compute nodes at the primary site 402 are also coupled to a master gateway node 414 which in turn is coupled to more than one different worker gateway nodes 416. It follows that in some approaches the compute nodes 412 send I/O operations which are executed at the primary site 402 (e.g., by the storage nodes 408) to the master gateway node 414 using any desired remote procedure call (RPC).

Once the I/O operations are sent to the master gateway node 414, the compute nodes 412 at the primary site 402 return to performing the respective applications being performed thereon. However, the master gateway node 414 stores the data replication operations received from the compute nodes 412 in a queue for approaches which implement asynchronous replication, e.g., such as asynchronous peer-to-peer remote copy (PPRC). Accordingly, although not shown in FIG. 4, the master gateway node 414 includes a queue in some asynchronous replication approaches. The queue may manage the received operations according to any desired structure. For instance, in some approaches the queue processes the operations received in a first-in-first-out (FIFO) manner. However, in other approaches the processes the operations received in a last-in-first-out (LIFO) manner. The master gateway node 414 may apply one or more optimization techniques on the asynchronous operations in some approaches. For example, the master gateway node 414 coalesces smaller, contiguous write operations into a single, larger write operation while removing negatable operations, e.g., such as file create operations which are followed by file removal operations, e.g., as would be appreciated by one skilled in the art after reading the present description.

In other approaches, data replication is achieved between the primary and secondary sites 402, 404 by implementing synchronous replication schemes, e.g., such as synchronous PPRC. Accordingly, data is transferred directly from the master gateway node 414 at the primary site 402 to the secondary site 404 upon being implemented at the primary site 402, e.g., as would be appreciated by one skilled in the art after reading the present description. In still other approaches, data replication within the primary and/or secondary sites 402, 404 is achieved by implementing incremental flash copy replication schemes. In such approaches, one or more bit maps are used to identify data that has been copied within the primary and/or secondary sites 402, 404, in addition to indicating whether any of the data has been updated since originally being stored at the given storage location, e.g., as will be described in further detail below.

With continued reference to FIG. 4, each of the worker gateway nodes 416 at the primary site 402 are paired (e.g., matched) with a corresponding I/O node 418 at the secondary site 404. Accordingly, asynchronous data replication operations which are queued at the master gateway node 414 can be distributed across the multiple worker gateway nodes 416, and then sent to the corresponding I/O nodes 418. Thus, the data replication operations are transferred from the primary site 402 to the secondary site 404 in an efficient manner which also actively avoids system crashes by distributing the processing load. The achievable throughput of the system is also increased as a result of implementing multiple worker gateway and I/O node pairs 416, 418 which are capable of sending data replication operations simultaneously and in parallel. It should also be noted that various ones of the nodes included at each of the respective sites 402, 404 may include a "normal queue" and/or a "primary queue" (not shown) for accumulating data operations. In preferred approaches, the data operations which have been accumulated in the primary queue have a higher priority than those data operations which have been accumulated in the "normal queue". In other words, data operations in the primary queue are implemented (e.g., transmitted) before data operations which are in the normal queue.

Upon receiving data replication operations, the I/O nodes 418 at the secondary site communicate with the data access nodes 408 such that data stored in the various storage devices 410 is updated accordingly. As a result, the secondary site 404 serves as a backup for the data stored at the primary site 402, e.g., for data retention purposes. Thus, any updates, deletes, overwrites, new writes, etc. performed at the primary site 402 and/or elsewhere in the distributed data replication system 400 are reflected at the secondary site 404.

It should be noted that the embodiment illustrated in FIG. 4 may include more or fewer components depending on the desired approach. For instance, the replication system 400 includes one or more servers at each of the primary and secondary sites 402, 404 in some approaches. The data access nodes 408 may be coupled to a server using a wireless connection, e.g., WiFi, Bluetooth, a cellular network, etc.; a wired connection, e.g., a cable, a fiber-optic link, a wire, etc.; etc., or any other type of connection which would be apparent to one skilled in the art after reading the present description. Moreover, the process of forming a communication link between any one or more of the data access nodes 408, a server (not shown), the compute nodes 412, the master gateway node 414, the worker gateway nodes 416, the I/O nodes 418, etc., may implement any protocols and/or processes which would be apparent to one skilled in the art after reading the present description.

According to some embodiments, a data management scheme, e.g., such as an active file management (AFM) caching scheme, is used to conduct the transfer of data between two storage sites such that data at each of the storage sites remains synced. As mentioned above, this is achieved in some approaches by implementing asynchronous continuous replication of the source volume at a first site to the target volume at a second site. In other approaches, the data at each of the storage sites may remain synched by implementing a synchronous replication of the source volume at the first storage site to the target volume at the second storage site. Moreover, the source and target volumes may be on the same or different machines depending on the approach, e.g., as would be appreciated by one skilled in the art after reading the present description.

In response to detecting a loss of data at the second storage location, the primary storage location may be queried in order to access the original copy of the data which has been lost. The data stored at the primary storage location corresponds to the source volume and is therefore updated accordingly as modifications are received. Therefore, the data from the source volume used to remedy the data loss at the target volume accurately represents the current state of the respective portion of storage. According to an example, which is in no way intended to limit the invention, storage systems implementing asynchronous PPRC data copy services may remedy a data loss experienced at the secondary storage location by setting one or more bits in an out of sync (OOS) bit map which corresponds to the data loss, e.g., as would be appreciated by one skilled in the art after reading the present description. According to another example, which again is in no way intended to limit the invention, storage systems implementing synchronous PPRC data copy services may remedy a data loss experienced at the secondary storage location by simply sending a request to the primary storage location for a copy of the data that has been lost. The data received from the primary storage location may thereby be stored in the one or more tracks of the secondary storage location which correspond to the data loss.

While data loss experienced at the secondary storage location may be relatively straightforward to remedy, data losses experienced at the primary storage location have proven to be much more difficult to recover from. As mentioned above, the data stored at the primary storage location corresponds to the source volume and is therefore updated accordingly as modifications and/or additions are received. However, at times the data at the secondary storage location does not accurately reflect updates which have been made to the data stored at the primary storage location. For instance, asynchronous data replication schemes involve queuing changes and/or additions to the data stored at a primary storage location before sending them to a secondary storage location for implementation. While the overall amount of strain placed on the system is reduced as a result of these asynchronous schemes, there are often differences between the data that is actually stored at each of the storage locations. Conventional processes have thereby been unable to effectively and efficiently recover from data loss scenarios which occur at a primary storage location.

Figure 5A:
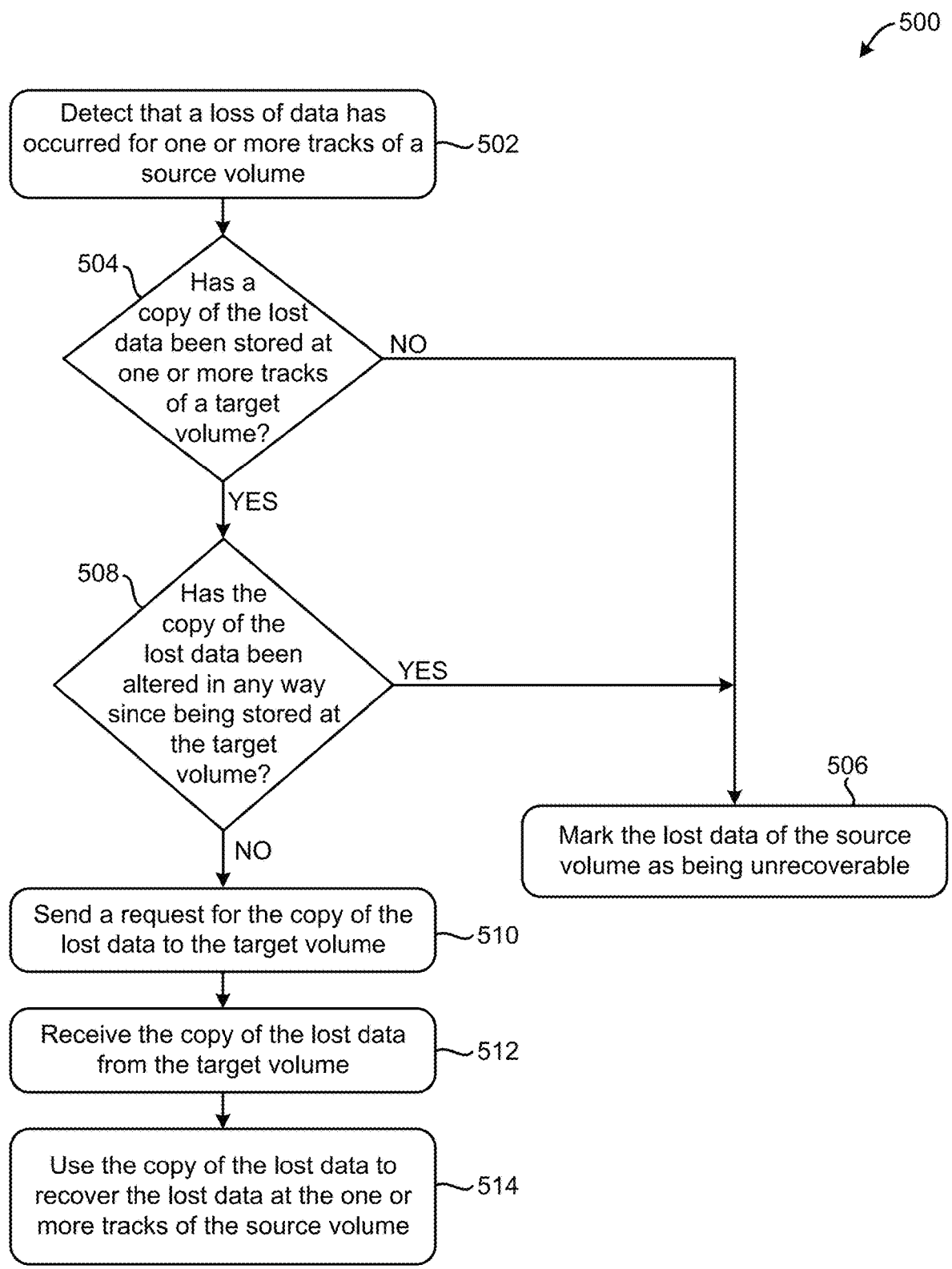
FIG. 5A is a flowchart of a method in accordance with one embodiment.

In sharp contrast to these conventional shortcomings, various ones of the embodiments included herein are able to effectively remedy data losses experienced at a primary storage location for a number of different data copy service schemes. As a result, the system downtime, processing delays, network strain, and other setbacks previously experienced by conventional processes as a result of data losses experienced at a primary storage location are essentially eliminated and system resources are desirably conserved. For instance, the flowchart of FIG. 5A illustrates a method 500 of remedying data losses experienced at a primary storage location of a distributed data replication system in accordance with one embodiment. The method 500 may be performed in accordance with the present invention in any of the environments depicted in FIGS. 1-4, among others, in various embodiments. Of course, more or less operations than those specifically described in FIG. 5A may be included in method 500, as would be understood by one of skill in the art upon reading the present descriptions.

Each of the steps of the method 500 may be performed by any suitable component of the operating environment. For example, one or more of the processes included in method 500 are performed by one or more nodes of a primary machine at a primary storage site (e.g., see 402 of FIG. 4 above). In another example, one or more of the processes included in method 500 are performed by a controller included in a data storage machine which includes both the source and target volumes. However, in various other embodiments, the method 500 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown, operation 502 includes detecting that a loss of data has occurred for one or more tracks of a source volume. Data loss for a given track is detected in some approaches upon experiencing a read and/or write failure at the given track. For example, a memory controller which is unable to successfully perform a read operation on a specific track may determine that the lost data corresponding to the specific track is inaccessible (e.g., lost).

As mentioned above, a source volume may be considered as corresponding to a primary storage location, while a target volume may be considered as corresponding to a secondary storage location. Moreover, the primary and secondary storage locations may be located on the same or different data storage machines depending on the given approach. For example, the source and target volumes may be stored at locations which are on the same data storage machine for approaches implementing a flash copy data replication scheme, as would be appreciated by one skilled in the art. According to another example, the source volume may be stored at location on a first data storage machine, while the target volume is stored at a location on a second data storage machine for approaches implementing a PPRC data replication scheme.

Decision 504 further includes determining whether a copy of the lost data has been stored at one or more tracks of a target volume. In other words, decision 504 includes determining whether a copy of the lost data was stored at the target volume prior to becoming lost at the source volume. In preferred embodiments, the source and target volumes share a point-in-time copy relationship. It follows that the target volume includes a copy of data which is the same as the lost data at the source volume with respect to a certain point-in-time. As the data at the source volume is updated over time, the data at the target volume is updated as well in order to desirably maintain an accurate representation of the data at the source volume. However, the frequency by which the data at the target volume is updated depends on the specific point-in-time copy relationship shared between the volumes.

For example, in some approaches the point-in-time copy relationship shared between the source and target volumes is a flash copy relationship. With respect to the present description, the "flash copy relationship" can be supported by various different types of memory and generally involves copying data from a source volume to a target volume on the same data storage machine, e.g., as described above. Each of these copies are taken at a particular point in time, typically as the data continues to be read from and/or written to. A mapping correlation is formed between the source and target volumes to facilitate the point-in-time copy relationship, and may be formed using any known processes. According to an example, which is in no way intended to limit the invention, a management graphical user interface (GUI) is used to form the mapping correlation. The source and target volumes are also preferably about the same size (e.g., can store about the same amount of data). Upon implementing the mapping correlation, the flash copy relationship appears (e.g., to a user) to copy data instantly from the source volume to the target volume by performing the actual copying of the data in the background until completed.

The specific type of flash copy relationship implemented may also vary depending on the desired approach. For instance, the mapping correlation may be incremental, multitarget, cascaded, etc. For approaches implementing an incremental flash copy relationship between the source and target volumes, only the data at the source volume which has changed since a previous point-in-time copy operation was performed is copied to the target volume. In other words, incremental flash copy relationships ensure that the data being copied to the target volume includes the data which has been updated, but not stagnant data. It follows that this scheme reduces the amount of data which is actually transferred between the volumes, thereby also reducing processing delays, network strain, performance times, etc. More than one different type of flash copy relationship may even be implemented in some approaches. For example, a company may decide to implement an incremental flash copy relationship during standard business hours to improve performance efficiency, and a full flash copy relationship while the business is closed to ensure a thorough recovery of the data stored at a source volume.

Figure 5B:
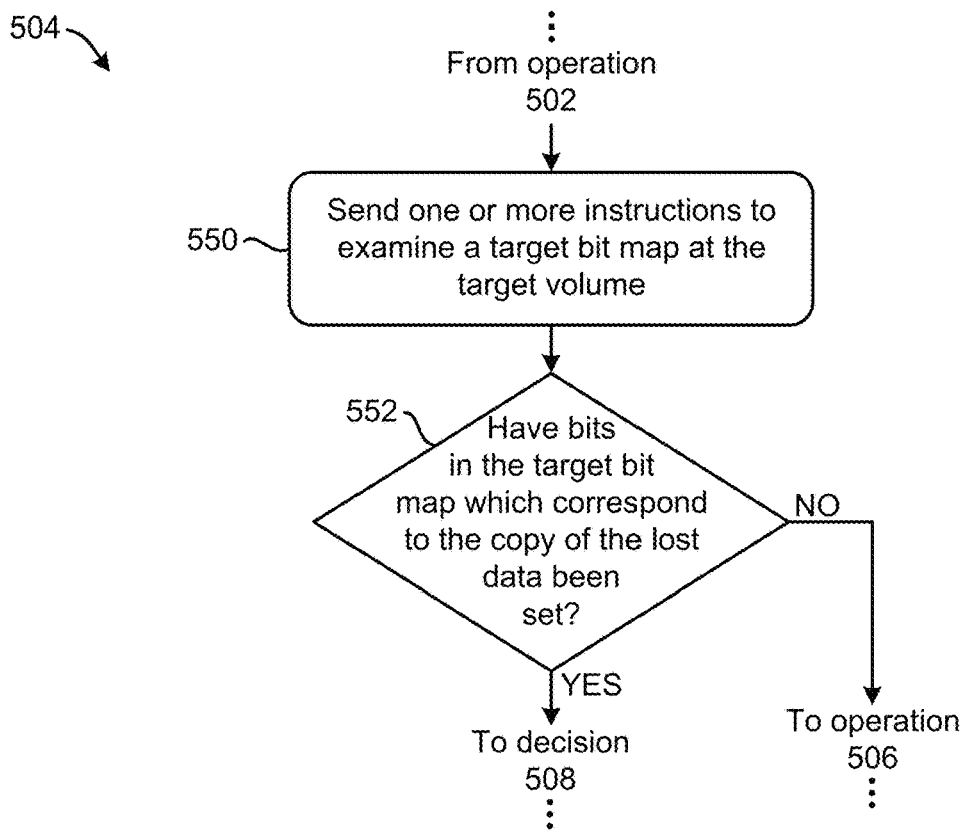
FIG. 5B is a flowchart of sub-processes for one of the operations in the method of FIG. 5A, in accordance with one embodiment.

The actual determination made in decision 504 may be based on different types of information depending on the approach. For instance, in some approaches determining whether a copy of the lost data has been stored at the target volume is based on a target bit map. Referring momentarily to FIG. 5B, exemplary sub-processes of determining whether a copy of the lost data has been stored at the target volume are illustrated in accordance with one embodiment, one or more of which may be used to perform decision 504 of FIG. 5A. However, it should be noted that the sub-processes of FIG. 5B are illustrated in accordance with one embodiment which is in no way intended to limit the invention.

As shown, sub-operation 550 includes sending one or more instructions to examine a target bit map at the target volume. A target bit map is used in some approaches in conjunction with an incremental flash copy relationship to identify which of the data at the source volume has been copied to the target volume. Accordingly, the one or more instructions may be sent to a central controller and/or a specific storage controller at the target volume. For approaches involving source and target volumes which are located on different data storage machines, these machines may actually be located at different locations in a distributed data storage system. Accordingly, the one or more instructions are sent over a network (e.g., see 406 of FIG. 4) which connects the data storage machines that include the source and target volumes, respectively. The process of actually examining the target bit map may be performed by accessing the bits in the target bit map which correspond to the specific data in question and/or the tracks associated therewith and identifying whether each of the bits have been set using any known techniques.

Upon receiving a response from the target volume indicating the contents of the target bit map, a determination may be made as to whether the bits in the target bit map which correspond to the data contents at the target volume have been set. See decision 552. In some approaches the response may automatically be sent from the target volume in response to satisfying the one or more instructions sent in sub-operation 550, while in other approaches the source volume actually requests a response from the target volume.

In response to determining that the bits in the target bit map which correspond to the lost data have not been set, a conclusion may be drawn that the lost data has not been stored in any of the tracks of the target volume. Accordingly, the flowchart in FIG. 5B is illustrated as proceeding from decision 552 to operation 506 of FIG. 5A. There, operation 506 includes marking the lost data of the source volume detected in operation 502 as being unrecoverable (e.g., lost). In other words, because a redundant copy of the lost data was not made prior to the data becoming lost, it is not recoverable from the target volume. Although the lost data is identified as being unrecoverable in such situations, other data recovery procedures known in the art may also be attempted. For example, an importance metric associated with the lost data may specify how much (if any) additional computing resources may be invested in recovering the lost data using less efficient and/or more time consuming processes.

However, returning to decision 552 of FIG. 5B, in response to determining that the bits in the target bit map which correspond to the lost data have been set, a conclusion may be drawn that the lost data has been stored in one or more tracks of the target volume. Accordingly, the flowchart in FIG. 5B is illustrated as proceeding from decision 552 to decision 508 of FIG. 5A. However, it should be noted that while decision 504 and the sub-processes thereof have been described herein as being made with respect to the lost data as a whole, each portion of the lost data is preferably evaluated individually. For example, each portion of data corresponding to a different track at the source volume is evaluated individually. Thus, in some approaches one or more portions of the lost data are determined as not having been copied to the target volume and therefore unrecoverable, while one or more portions of the lost data are determined as having been copied to the target volume and therefore recoverable. It follows that any of the processes and/or sub-processes described herein may be performed individually for each portion of lost data, e.g., as would be appreciated by one skilled in the art after reading the present description.

Referring back now to FIG. 5A, decision 508 is performed in response to determining that a copy of the lost data has been stored at the target volume. As shown, decision 508 includes determining whether the copy of the lost data has been altered (e.g., amended, appended to, partially deleted, etc.) in any way since being stored at the target volume. In other words, decision 508 involves determining whether the copy of the lost data stored at the target volume actually matches the lost data identified in operation 502. As mentioned above, different copies of the same data included in a distributed data replication system are updated at different storage locations. It takes time for these updates to be replicated at each copy of the same data, and therefore two or more copies of data which are thought to be the same may actually differ from each other by varying degrees.

Figure 5C:
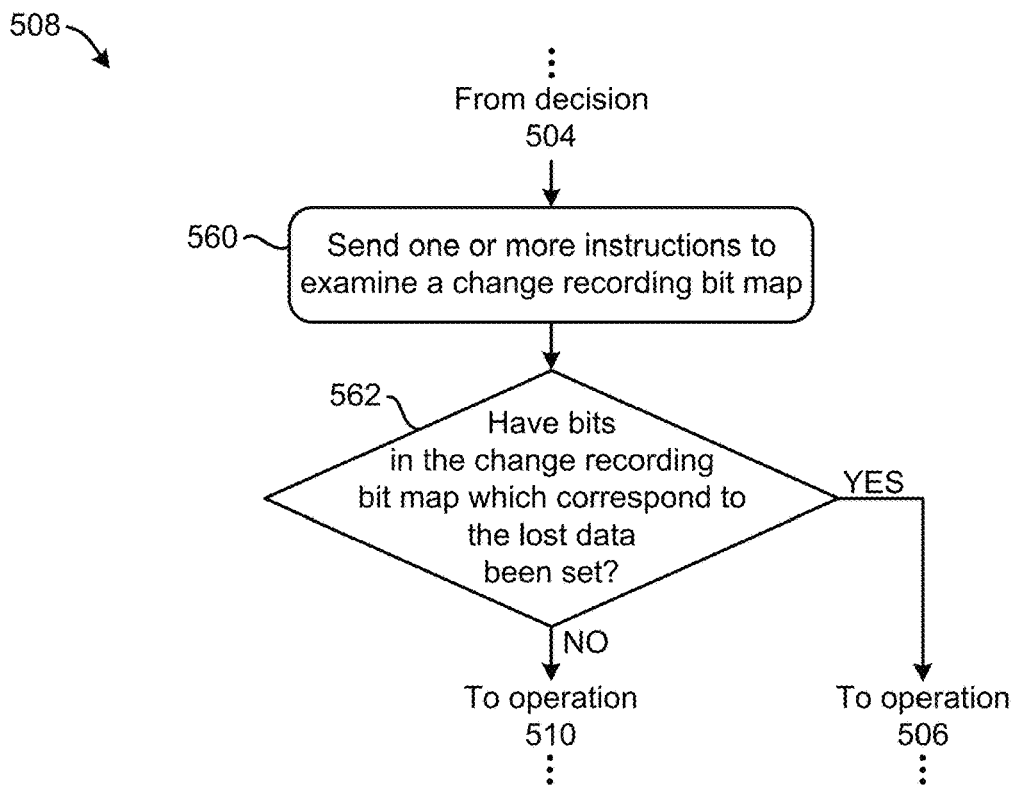
FIG. 5C is a flowchart of sub-processes for one of the operations in the method of FIG. 5A, in accordance with one embodiment.

The actual determination made in decision 508 may be based on different types of information depending on the approach. For instance, in some approaches determining whether the copy of the lost data has been altered in any way since being stored at the target volume is based on a change recording bit map. Referring momentarily to FIG. 5C, exemplary sub-processes of determining whether the copy of the lost data has been altered in any way since being stored at the target volume are illustrated in accordance with one embodiment, one or more of which may be used to perform decision 508 of FIG. 5A. However, it should be noted that the sub-processes of FIG. 5C are illustrated in accordance with one embodiment which is in no way intended to limit the invention.

As shown, sub-operation 560 includes sending one or more instructions to examine a change recording bit map. A change recording bit map is used in some approaches in conjunction with an incremental flash copy relationship to identify data that has been updated at a first storage location since previously being transferred (e.g., copied) to a second storage location. According to an example, a file originally stored in the source volume is replicated to the target volume sometime thereafter. At this point, the one or more bits in the change recording bit map which correspond to the copy of the file stored at the source volume have not been set because the copy at the source volume has not been updated since being replicated to the target volume. However, one or more of the bits in the change recording bit map are set in response to a modification being made to the corresponding portion of the file at the source volume. Activated bits in the change recording bit map may be deactivated in response to transferring the updated portions of the file to the target volume, and the process may be repeated. It follows that the change recording bit map is able to track which portions of data at the source volume are not accurately represented at the target volume.

Referring still to sub-operation 560, the one or more instructions may be sent to a storage controller at the source volume. The process of actually examining the change recording bit map may be performed by accessing the bits in the bit map which correspond to the specific data in question and/or tracks at the source volume which are associated therewith. Moreover, an identification as to whether each of the bits have been set may be made using any known techniques.

Upon receiving an indication as to the contents of the change recording bit map, a determination of whether the bits in the change recording bit map which correspond to the lost data have been set. See decision 562. In response to determining that the bits in the change recording bit map which correspond to the copy of the lost data have been set, a conclusion may be drawn that the copy of the lost data in the one or more tracks of the target volume do not accurately represent the lost data itself. In other words, alterations made to the lost data were not yet replicated to the copy of the lost data at the target volume. Accordingly, the flowchart in FIG. 5C is illustrated as proceeding from decision 562 to operation 506 of FIG. 5A. As mentioned above, operation 506 includes marking the lost data of the source volume detected in operation 502 as being unrecoverable (e.g., lost). Although the lost data is identified as being unrecoverable in such situations, other data recovery procedures known in the art may also be attempted. For example, an importance metric associated with the lost data may specify how much (if any) additional computing resources may be invested in recovering the lost data using less efficient and/or more time consuming processes. For example, the alterations which were made to the lost data at the source volume may still be located in a queue of data to be transferred to the target volume. The data in the queue may thereby be used to modify the outdated copy of the lost data at the target volume.

However, returning to decision 562 of FIG. 5C, in response to determining that the bits in the target bit map which correspond to the lost data have not been set, a conclusion may be drawn that the copy of the lost data in the one or more tracks of the target volume accurately represent the lost data itself. In other words, the lost data at the source volume and the copy of the lost data at the target volume were accurate copies of each other at the point in time that the data at the source volume was lost. Accordingly, the flowchart in FIG. 5C is illustrated as proceeding from decision 562 to operation 510 of FIG. 5A. It should again be noted that while decision 508 and the sub-processes thereof have been described herein as being made with respect to the lost data as a whole, each portion of the lost data is preferably evaluated individually. For example, each portion of data corresponding to a different track at the source volume is evaluated individually. Thus, in some approaches one or more portions of the lost data are determined as not being accurately represented by the data at the target volume and therefore unrecoverable, while one or more portions of the lost data are determined as being accurately represented by the data at the target volume and therefore recoverable. It follows that any of the processes and/or sub-processes described herein may be performed individually for each portion of lost data, e.g., as would be appreciated by one skilled in the art after reading the present description.

Referring back now to FIG. 5A, operation 510 is performed in response to determining that a copy of the lost data in the one or more tracks of the target volume accurately represent the lost data itself. As shown, operation 510 includes sending a request for the copy of the lost data to the target volume, while operation 512 includes receiving the copy of the lost data from the target volume. Depending on the approach, the copy of the lost data may be received as one or more packets of information depending on the amount of data being transferred between the volumes, the type of network connecting the data storage machines in which the volumes are stored, availability of system resources, etc. Furthermore, operation 514 includes using the copy of the lost data to recover the lost data at the one or more tracks of the source volume. In other words, operation 514 includes using the copy of the lost data received from the target volume to refill the one or more tracks at the source volume which originally experienced the data loss. According to some approaches, the data may be written to the one or more tracks at the source volume using any known write operations.

It follows that the various processes included in FIGS. 5A-5C and the approaches corresponding thereto are able to recover data which has become lost at a source volume in a distributed data replication system. It should also be noted that although various ones of the approaches herein have been described in the context of distributed data replication systems implementing incremental flash copy replication schemes, this is in no way intended to limit the invention. For instance, any one or more of the approaches included herein may be applied to distributed data replication systems which implement replication schemes that utilize bit maps which are similar to and/or the same as a change recording bit map, e.g., as would be appreciated by one skilled in the art after reading the present description.

Figure 6:
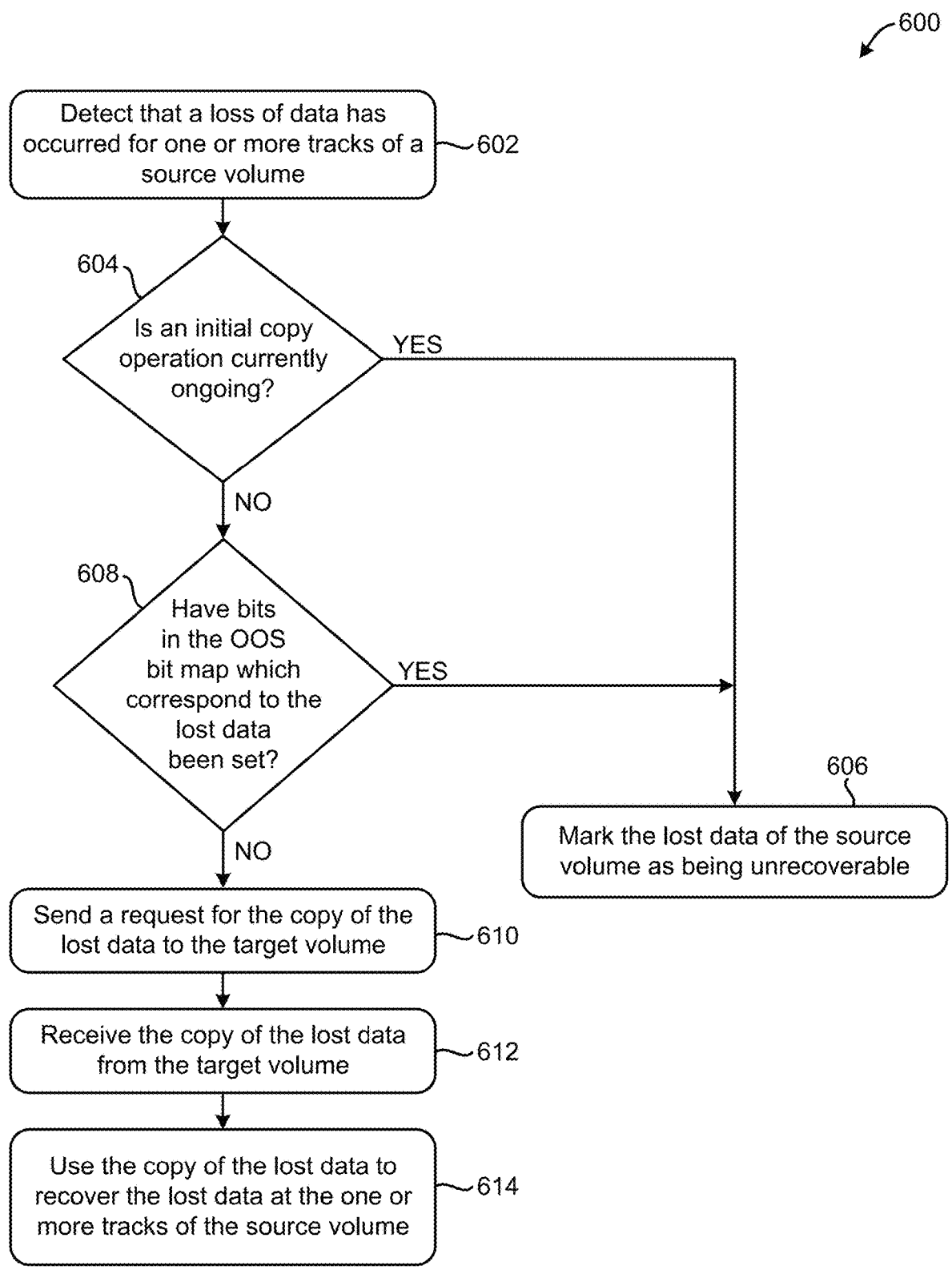
FIG. 6 is a flowchart of a method in accordance with one embodiment.

Looking now to FIG. 6, a method 600 of remedying data losses experienced at a primary storage location of a distributed data replication system is illustrated in accordance with one embodiment. Specifically, the processes included in method 600 have been described in the context of a distributed data replication system implementing an asynchronous PPRC replication scheme, which is in no way intended to limit the invention. Moreover, method 600 may be performed in accordance with the present invention in any of the environments depicted in FIGS. 1-4, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, one or more of the processes included in method 600 are performed by one or more nodes of a primary machine at a primary storage site (e.g., see 402 of FIG. 4 above). However, in various other embodiments, the method 600 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

As shown, operation 602 includes detecting that a loss of data has occurred for one or more tracks of a source volume. As mentioned above, data loss for a given track is detected in some approaches upon experiencing a read and/or write failure at the given track. For example, a memory controller which is unable to successfully perform a read operation on a specific track may determine that the lost data corresponding to the specific track is inaccessible (e.g., lost). Moreover, the source volume is located on a first data storage machine, while a target volume is located on a second data storage machine which is different than the first data storage machine, e.g., as will soon become apparent.

Decision 604 further includes determining whether an initial copy operation is currently ongoing. An initial copy operation is performed as a process of establishing the PPRC replication scheme and involves copying the data stored at the source volume to a target volume for a first time. In other words, decision 604 includes determining whether the asynchronous PPRC replication scheme is actively filling the target volume with copies of the data stored at the source volume. In response to determining that an initial copy operation is currently ongoing, method 600 proceeds to operation 606 which includes marking the lost data of the source volume detected in operation 602 as being unrecoverable (e.g., lost). In other words, because a full, redundant copy of the data stored at the source volume has not yet been formed at the target volume, the lost data is not recoverable from the target volume. As mentioned above, although the lost data is identified as being unrecoverable in such situations, other data recovery procedures known in the art may also be attempted. For example, an importance metric associated with the lost data may specify how much (if any) additional computing resources may be invested in recovering the lost data using less efficient and/or more time consuming processes that are available.

Returning to decision 604, method 600 alternatively proceeds to decision 608 in response to determining that an initial copy operation is not currently ongoing. There, decision 608 includes determining whether one or more bits in an OOS bit map which corresponds to the lost data are set. The OOS bit map functions similarly to the change recording bit map described above in that the OOS bit map indicates whether each portion of data at the source volume is accurately represented by the data at the target volume.

As mentioned above, although the target volume includes a copy of the data at the source volume, the data at the source volume is updated over time. The data at the target volume is updated as well in order to desirably maintain an accurate representation of the data at the source volume, yet the frequency by which the data at the target volume is updated varies depending on the approach. For example, a file originally stored at the source volume is thereafter replicated to the target volume, e.g., in an initial copy operation. At this point, the one or more bits in an OOS bit map which correspond to the copy of the file stored at the source volume have not been set because the copy at the source volume has not been updated since being replicated to the target volume. However, one or more of the bits in the OOS bit map are set in response to a modification being made to the corresponding portion of the file at the source volume. Activated bits in the OOS bit map may be deactivated in response to transferring the updated portions of the file to the target volume, and the process may be repeated. Again, the OOS bit map is able to track which portions of data at the source volume are not accurately represented at the target volume.

Accordingly, method 600 proceeds to operation 606 from decision 608 in response to determining that the one or more bits in an OOS bit map which corresponds to the lost data are set. The lost data at the source volume is thereby marked as being unrecoverable because the copy of the lost data at the target volume is outdated. However, it should be noted that in some approaches the outdated copy of the lost data at the target volume may be used to recover a previous version of the lost data. For example, a user may be informed that the most recent version of the lost data is unrecoverable, but a previous version of the lost data is available.

Returning to decision 608, method 600 proceeds to operation 610 in response to determining that the one or more bits in an OOS bit map which corresponds to the lost data are not set. There, operation 610 includes sending a request for the copy of the lost data to the target volume, while operation 612 includes receiving the copy of the lost data from the target volume. Depending on the approach, the copy of the lost data may be received as one or more packets of information depending on the amount of data being transferred between the machines on which the volumes are stored, the type of network connecting the storage machines, availability of system resources, etc. Furthermore, operation 614 includes using the copy of the lost data to recover the lost data at the one or more tracks of the source volume. In other words, operation 614 includes using the copy of the lost data received from the target volume to refill the one or more tracks at the source volume which originally experienced the data loss. According to some approaches, the data may be written to the one or more tracks at the source volume using any known write operations.

It should be noted that while the processes included in method 600 have been described in the context of a distributed data replication system implementing an asynchronous PPRC replication scheme, similar processes may be implemented by distributed data replication systems implementing synchronous PPRC replication schemes. For example, a distributed data replication system implementing a synchronous PPRC replication scheme which is determined to be operating nominally (e.g., not experiencing any errors), may simply request a copy of the lost data from the target volume.

It follows that various ones of the approaches included herein are able to effectively and efficiently recover from data loss events experienced at a primary storage location in a distributed data replication system. Moreover, these approaches may be applied for a number of different data copy service schemes. As a result, the system downtime, processing delays, network strain, and other setbacks previously experienced by conventional processes as a result of data losses experienced at a primary storage location are essentially eliminated and system resources are desirably conserved.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
   in response to experiencing a loss of data at a first track of a source volume, determining whether a copy of the lost data has been stored at a second track of a target volume, wherein the source and target volumes share a point-in-time copy relationship;
   in response to determining that a copy of the lost data has been stored at a second track of the target volume, determining whether the copy of the lost data has been altered since being stored at the second track of the target volume;
   in response to determining that the copy of the lost data has not been altered since being stored at the second track of the target volume, sending a request for the copy of the lost data to the target volume;
   receiving the copy of the lost data; and
   using the copy of the lost data to recover the lost data at the first track of the source volume,
   wherein the point-in-time copy relationship is an incremental flash copy relationship between the source and target volumes that is stored on a same machine.

2. The computer-implemented method of claim 1, wherein determining whether a copy of the lost data has been stored at a second track of a target volume includes:
   sending one or more instructions to examine a target bit map at the target volume;
   determining whether a bit in the target bit map which corresponds to the second track of the target volume has been set; and
   determining that the lost data has been stored at the second track of the target volume in response to determining that the bit in the target bit map which corresponds to the second track of the target volume has been set.

3. The computer-implemented method of claim 2, comprising:
   in response to determining that a copy of the lost data has not been stored at a second track of the target volume, marking the lost data at the first track of the source volume as unrecoverable,
   wherein determining whether a copy of the lost data has been stored at a second track of a target volume includes:
   determining that the lost data has not been stored at the second track of the target volume in response to determining that the bit in the target bit map which corresponds to the second track of the target volume has not been set.

4. The computer-implemented method of claim 1, wherein determining whether the copy of the lost data has been altered since being stored at the second track of the target volume includes:
   sending one or more instructions to examine a change recording bit map;
   determining whether a bit in the change recording bit map which corresponds to the first track of the source volume has been set; and
   determining that the copy of the lost data has not been altered since being stored at the second track of the target volume in response to determining that the bit in the change recording bit map which corresponds to the first track of the source volume has not been set.

5. The computer-implemented method of claim 4, comprising:
   in response to determining that the copy of the lost data has been altered since being stored at the second track of the target volume, marking the lost data at the first track of the source volume as unrecoverable,
   wherein determining whether the copy of the lost data has been altered since being stored at the second track of the target volume includes:
   determining that the copy of the lost data has been altered since being stored at the second track of the target volume in response to determining that the bit in the change recording bit map which corresponds to the first track of the source volume has been set.

6. The computer-implemented method of claim 1, wherein the point-in-time copy relationship is the incremental flash copy relationship during a first predetermined period, wherein the point-in-time copy relationship is a full flash copy relationship during a second predetermined period, wherein the first predetermined period does not overlap the second predetermined period.

7. A computer program product comprising a computer readable storage medium having program instructions embodied therewith, the program instructions readable and/or executable by a processor to cause the processor to:
   in response to experiencing a loss of data at a first track of a source volume, determine, by the processor, whether a copy of the lost data has been stored at a second track of a target volume, wherein the source and target volumes share a point-in-time copy relationship;
   in response to determining that a copy of the lost data has been stored at a second track of the target volume, determine, by the processor, whether the copy of the lost data has been altered since being stored at the second track of the target volume;
   in response to determining that the copy of the lost data has not been altered since being stored at the second track of the target volume, send, by the processor, a request for the copy of the lost data to the target volume;
   receive, by the processor, the copy of the lost data; and
   use, by the processor, the copy of the lost data to recover the lost data at the first track of the source volume,
   wherein the point-in-time copy relationship is an incremental flash copy relationship between the source and target volumes that is stored on a same machine.

8. The computer program product of claim 7, wherein determining whether a copy of the lost data has been stored at a second track of a target volume includes:
   sending one or more instructions to examine a target bit map at the target volume;
   determining whether a bit in the target bit map which corresponds to the second track of the target volume has been set; and
   determining that the lost data has been stored at the second track of the target volume in response to determining that the bit in the target bit map which corresponds to the second track of the target volume has been set.

9. The computer program product of claim 8, the program instructions readable and/or executable by the processor to cause the processor to:
   in response to determining that a copy of the lost data has not been stored at a second track of the target volume, mark, by the processor, the lost data at the first track of the source volume as unrecoverable,
   wherein determining whether a copy of the lost data has been stored at a second track of a target volume includes:
   determining that the lost data has not been stored at the second track of the target volume in response to determining that the bit in the target bit map which corresponds to the second track of the target volume has not been set.

10. The computer program product of claim 7, wherein determining whether the copy of the lost data has been altered since being stored at the second track of the target volume includes:
    sending one or more instructions to examine a change recording bit map;
    determining whether a bit in the change recording bit map which corresponds to the first track of the source volume has been set; and
    determining that the copy of the lost data has not been altered since being stored at the second track of the target volume in response to determining that the bit in the change recording bit map which corresponds to the first track of the source volume has not been set.

11. The computer program product of claim 10, the program instructions readable and/or executable by the processor to cause the processor to:
    in response to determining that the copy of the lost data has been altered since being stored at the second track of the target volume, mark, by the processor, the lost data at the first track of the source volume as unrecoverable,
    wherein determining whether the copy of the lost data has been altered since being stored at the second track of the target volume includes:
    determining that the copy of the lost data has been altered since being stored at the second track of the target volume in response to determining that the bit in the change recording bit map which corresponds to the first track of the source volume has been set.

12. The computer program product of claim 7, wherein the machine includes a master gateway node which includes a queue that stores asynchronous data replication operations, wherein the master gateway node applies one or more optimization techniques to the asynchronous data replication operations stored in the queue.

13. A system, comprising:
    a processor; and
    logic integrated with the processor, executable by the processor, or integrated with and executable by the processor, the logic being configured to:
    in response to experiencing a loss of data at a first track of a source volume, determine, by the processor, whether a copy of the lost data has been stored at a second track of a target volume, wherein the source and target volumes share a point-in-time copy relationship;
    in response to determining that a copy of the lost data has been stored at a second track of the target volume, determine, by the processor, whether the copy of the lost data has been altered since being stored at the second track of the target volume;
    in response to determining that the copy of the lost data has not been altered since being stored at the second track of the target volume, send, by the processor, a request for the copy of the lost data to the target volume;
    receive, by the processor, the copy of the lost data; and
    use, by the processor, the copy of the lost data to recover the lost data at the first track of the source volume,
    wherein the point-in-time copy relationship is an incremental flash copy relationship between the source and target volumes that is stored on a same machine.

14. The system of claim 13, wherein determining whether a copy of the lost data has been stored at a second track of a target volume includes:
    sending one or more instructions to examine a target bit map at the target volume;
    determining whether a bit in the target bit map which corresponds to the second track of the target volume has been set; and determining that the lost data has been stored at the second track of the target volume in response to determining that the bit in the target bit map which corresponds to the second track of the target volume has been set.

15. The system of claim 14, the logic being configured to:

in response to determining that a copy of the lost data has not been stored at a second track of the target volume, mark, by the processor, the lost data at the first track of the source volume as unrecoverable, wherein determining whether a copy of the lost data has been stored at a second track of a target volume includes:

determining that the lost data has not been stored at the second track of the target volume in response to determining that the bit in the target bit map which corresponds to the second track of the target volume has not been set.

16. The system of claim 13, the logic being configured to:

in response to determining that the copy of the lost data has been altered since being stored at the second track of the target volume, mark, by the processor, the lost data at the first track of the source volume as unrecoverable, wherein determining whether the copy of the lost data has been altered since being stored at the second track of the target volume includes:

sending one or more instructions to examine a change recording bit map;

determining whether a bit in the change recording bit map which corresponds to the first track of the source volume has been set;

determining that the copy of the lost data has not been altered since being stored at the second track of the target volume in response to determining that the bit in the change recording bit map which corresponds to the first track of the source volume has not been set; and determining that the copy of the lost data has been altered since being stored at the second track of the target volume in response to determining that the bit in the change recording bit map which corresponds to the first track of the source volume has been set.

17. The system of claim 13, wherein the point-in-time copy relationship is an incremental flash copy relationship during a first predetermined period of time, wherein the point-in-time copy relationship is a full flash copy relationship during a second predetermined period of time, wherein the first predetermined period of time does not overlap the second predetermined period of time.

18. The system of claim 13, wherein the source and target volumes are configured to store about a same amount of data therein, wherein the machine includes a master gateway node, wherein the master gateway node includes a queue that stores asynchronous data replication operations, wherein the master gateway node applies one or more optimization techniques to the asynchronous data replication operations stored in the queue.

* * * * *